Figure 12:
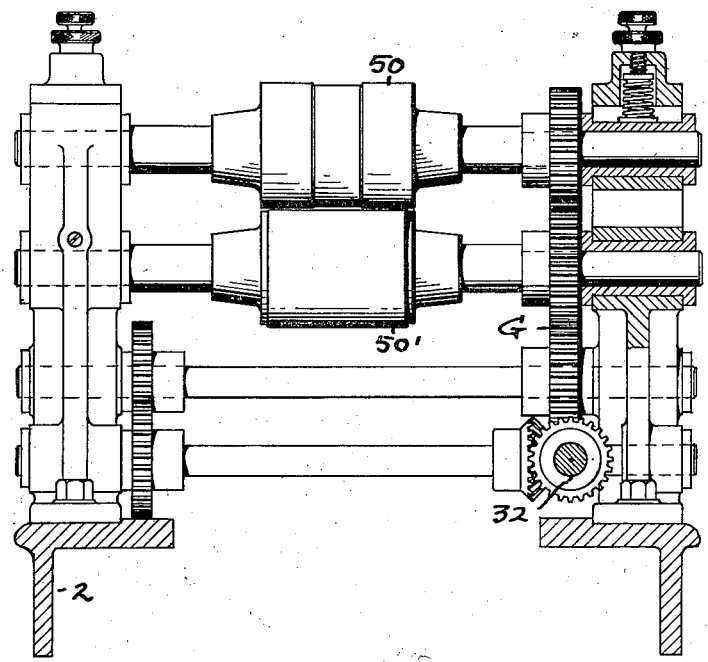
Figure 13:
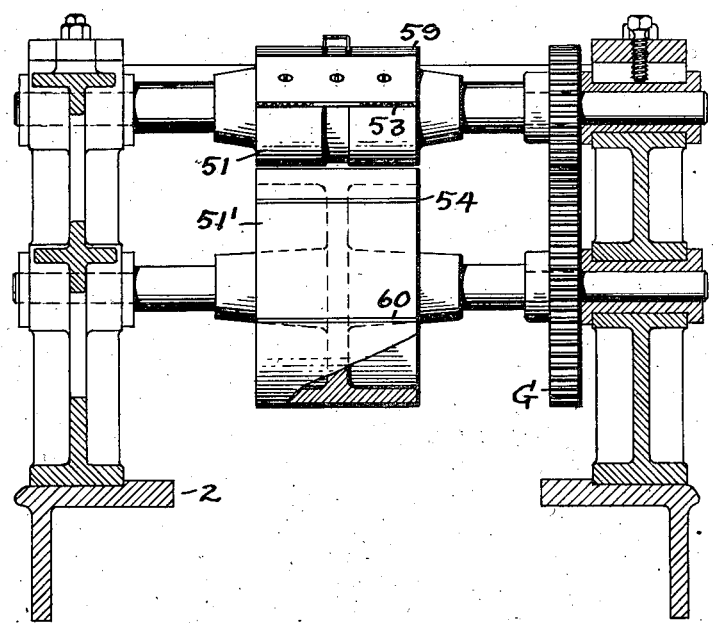
Figure 14:
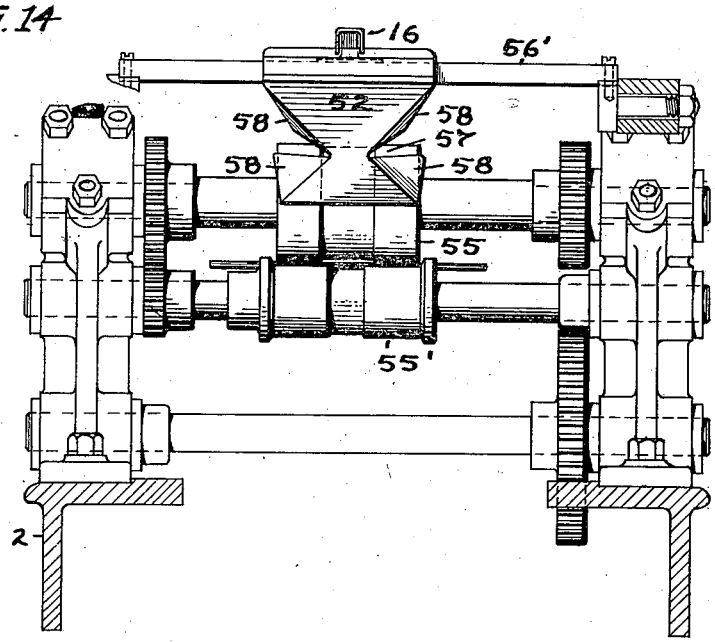
Figure 15:
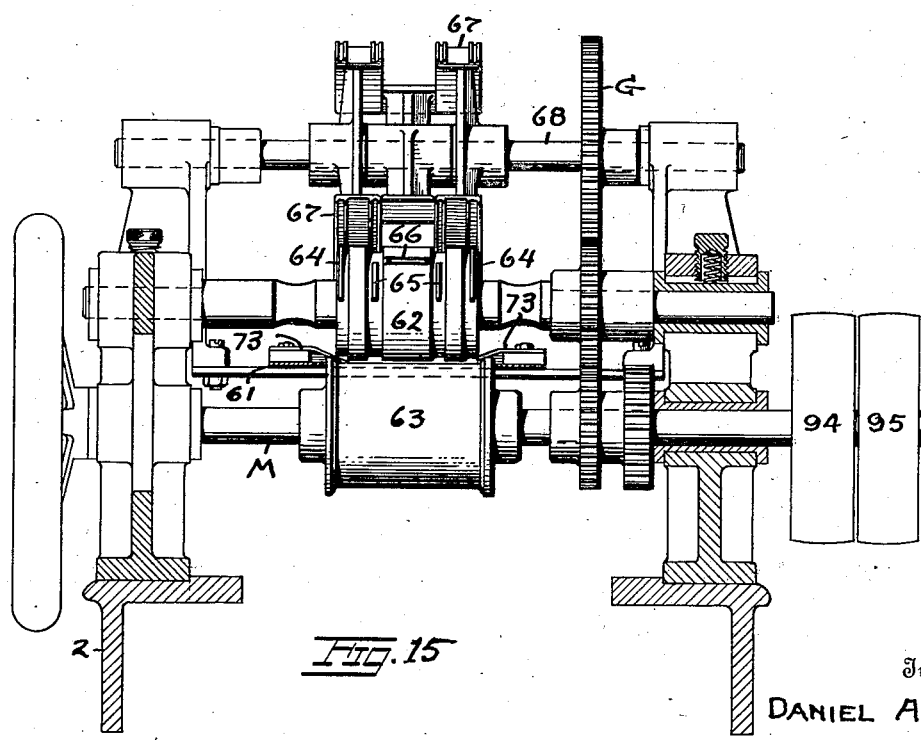
Figure 16:
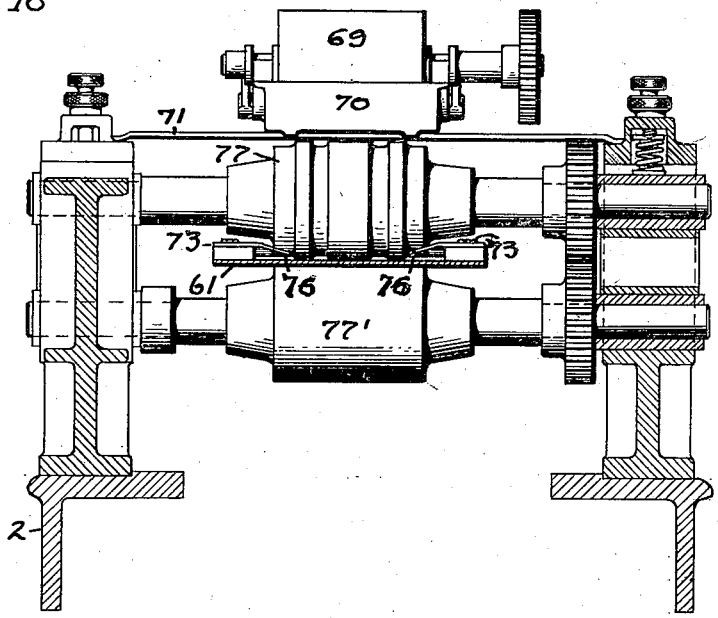
Figure 17:
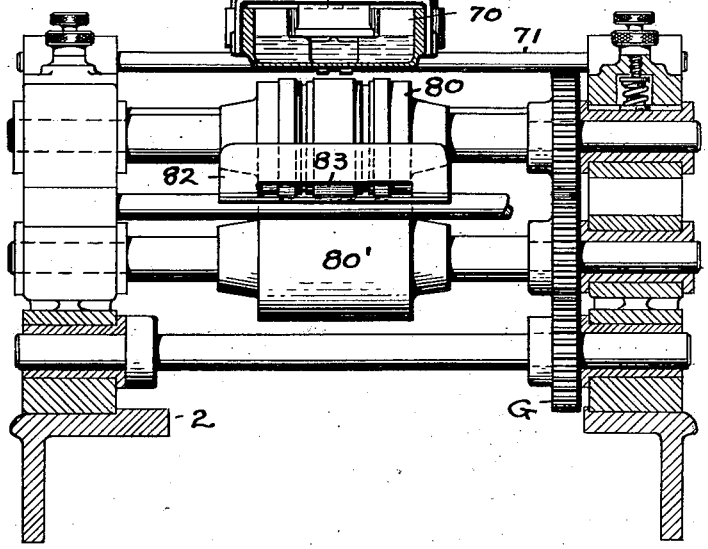
Figure 18:
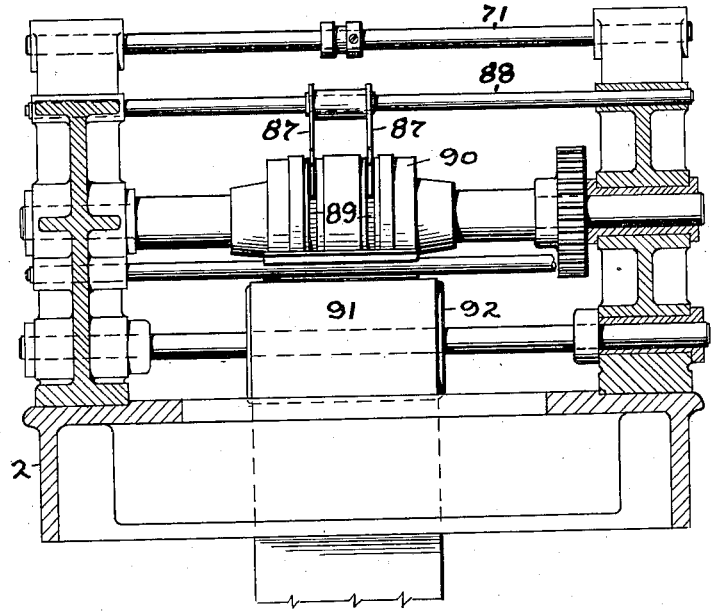

June 7, 1927. 1,631,452
D. APPEL
MACHINE FOR MAKING PAPER BAGS
Filed Sept. 18, 1924 20 Sheets-Sheet 1
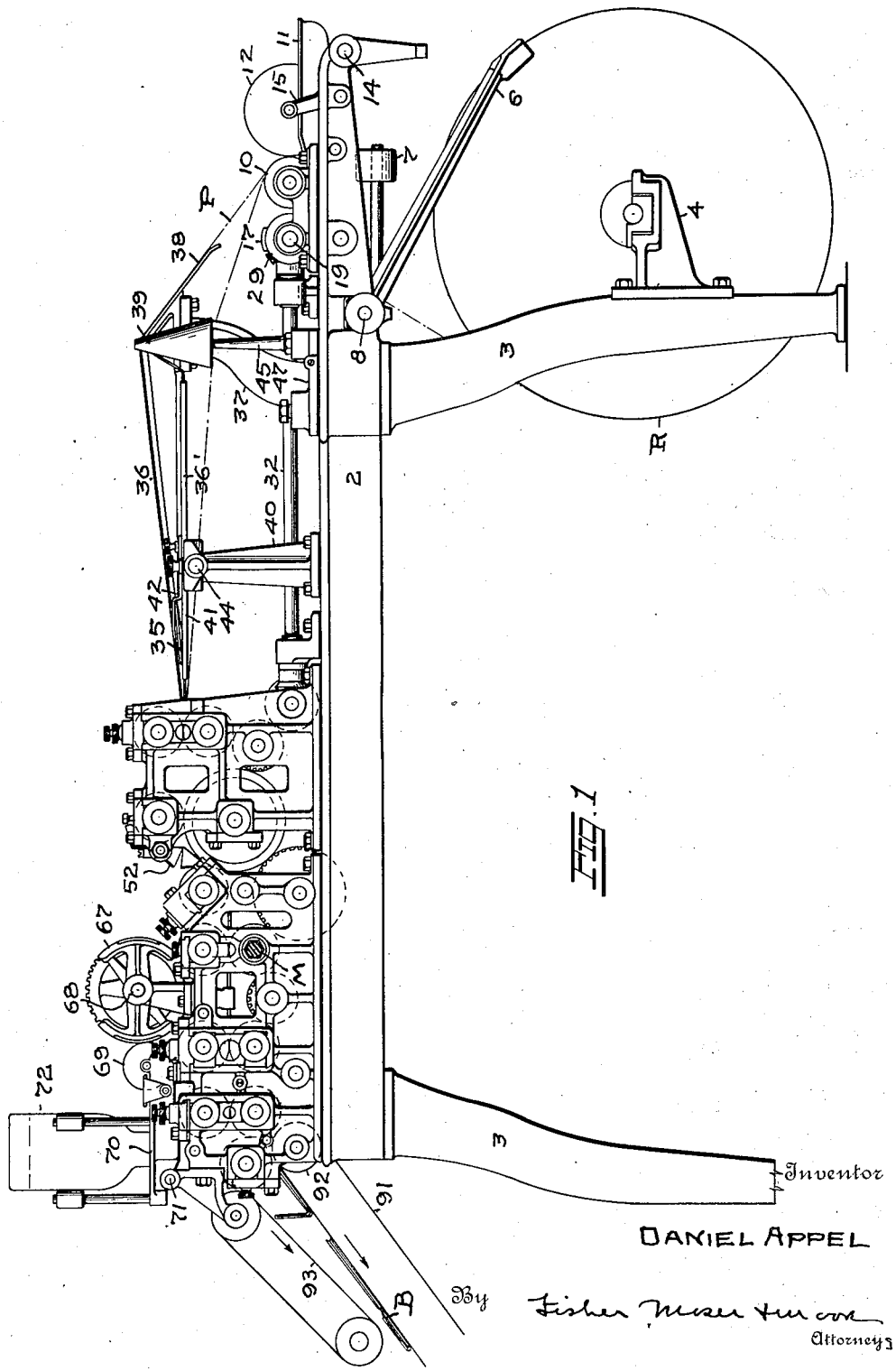

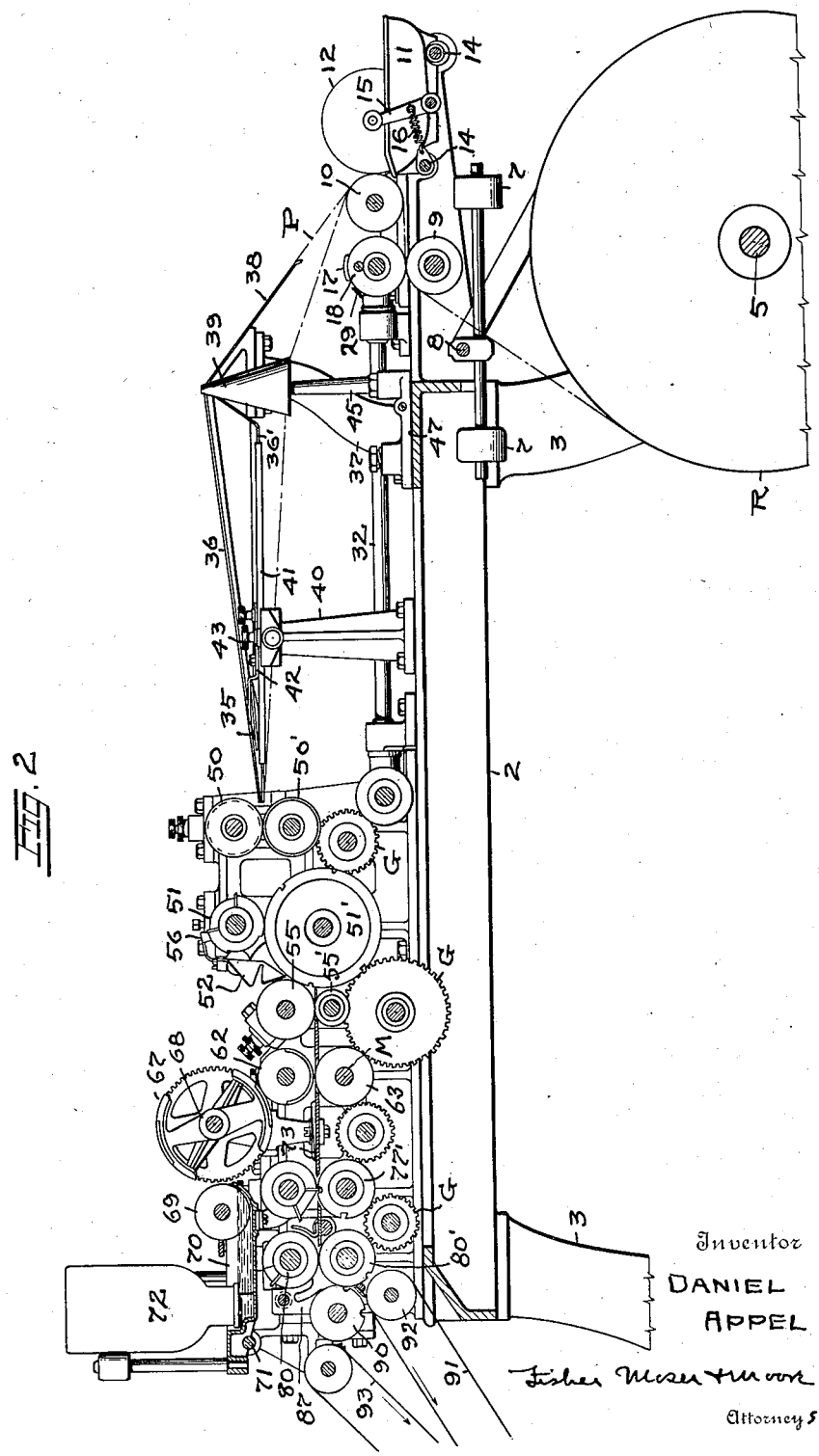

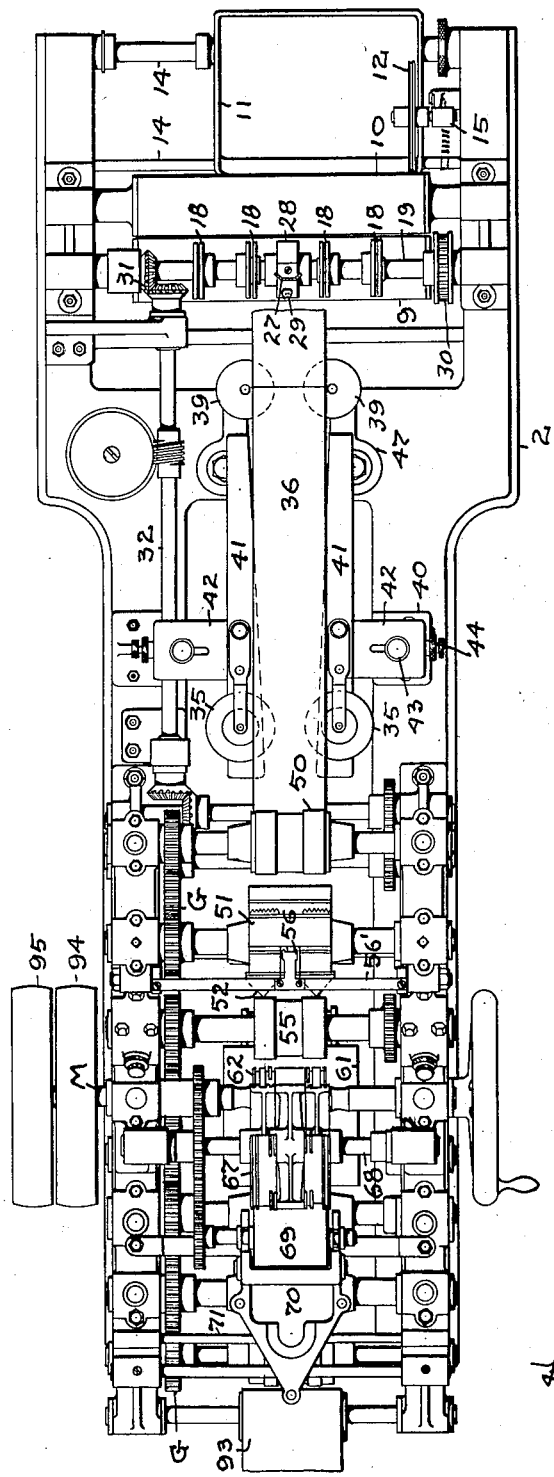

June 7, 1927.
D. APPEL
1,631,452
MACHINE FOR MAKING PAPER BAGS
Filed Sept. 18, 1924 20 Sheets-Sheet 4
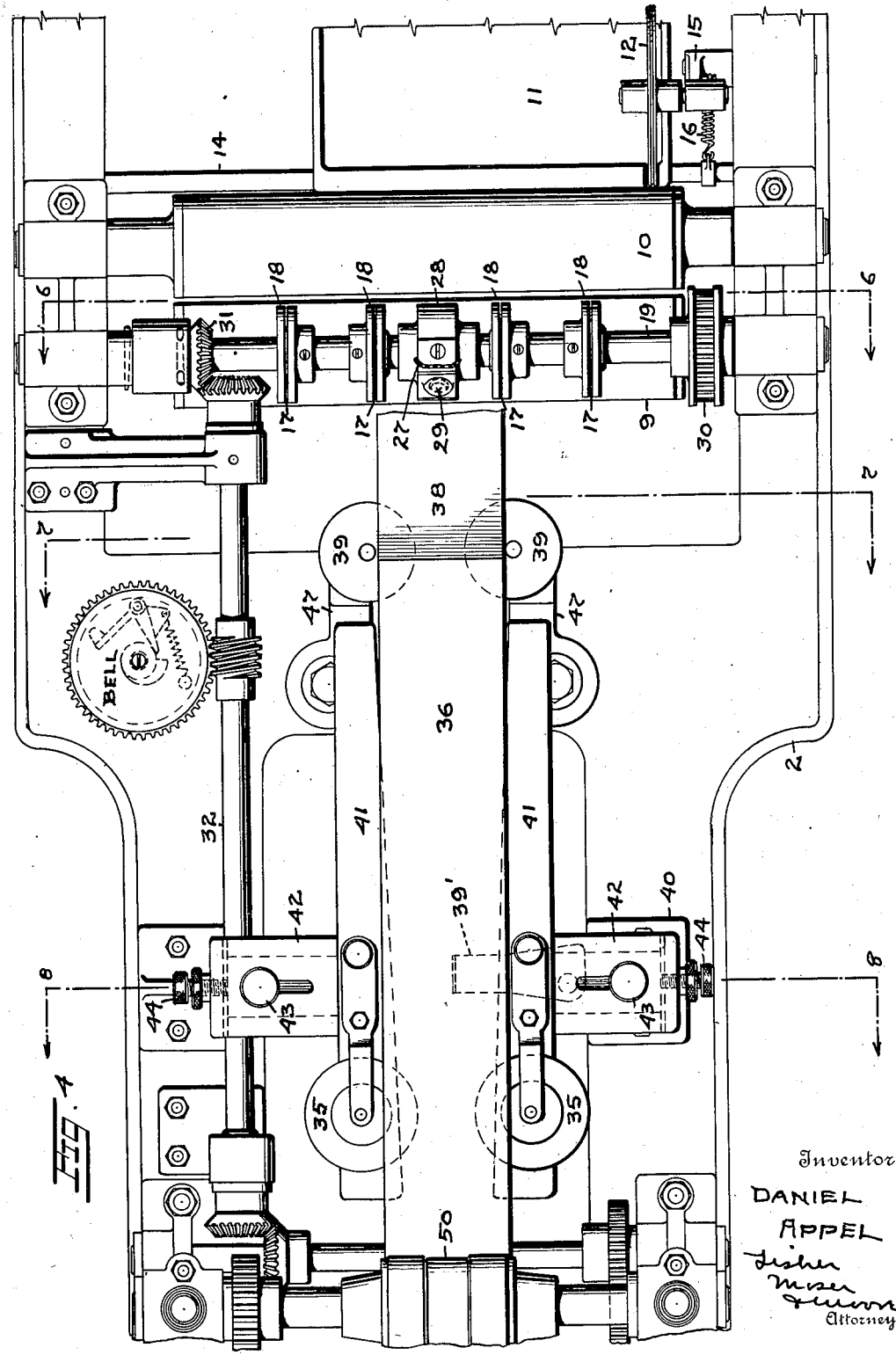
Inventor
DANIEL APPEL
Attorneys June 7, 1927.
D. APPEL
1,631,452
MACHINE FOR MAKING PAPER BAGS
Filed Sept. 18, 1924  20 Sheets-Sheet 5
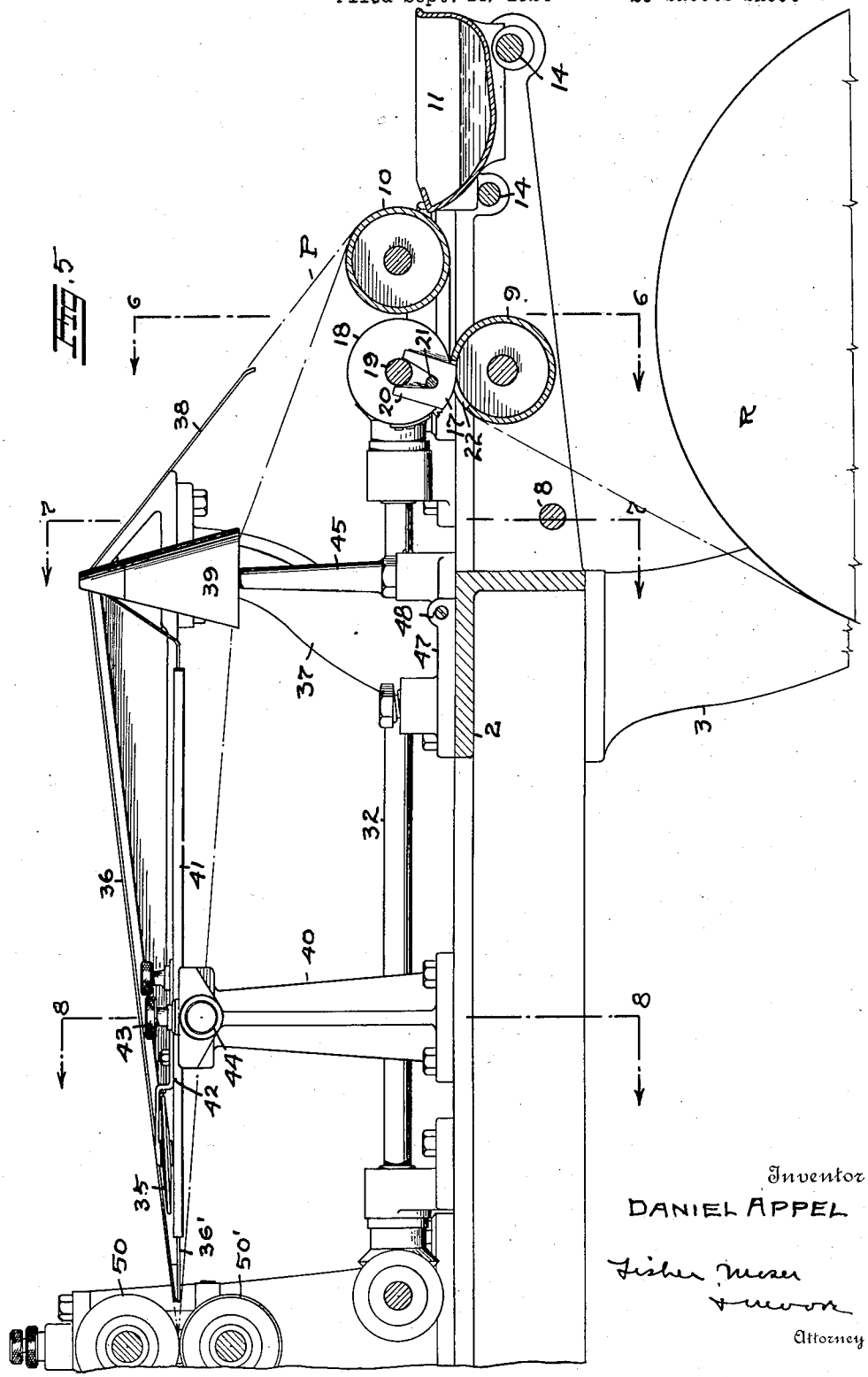
Inventor
DANIEL APPEL
Attorneys

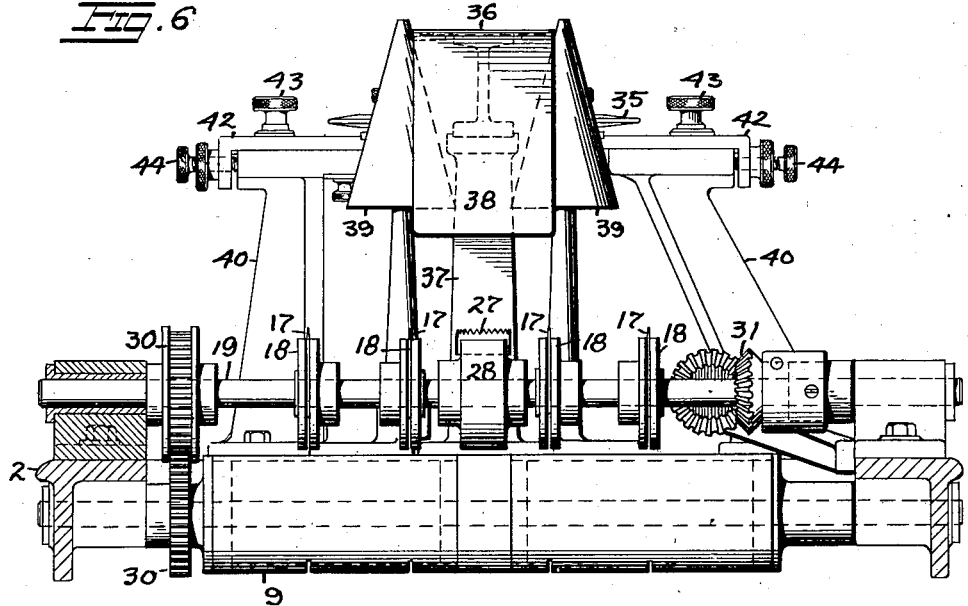
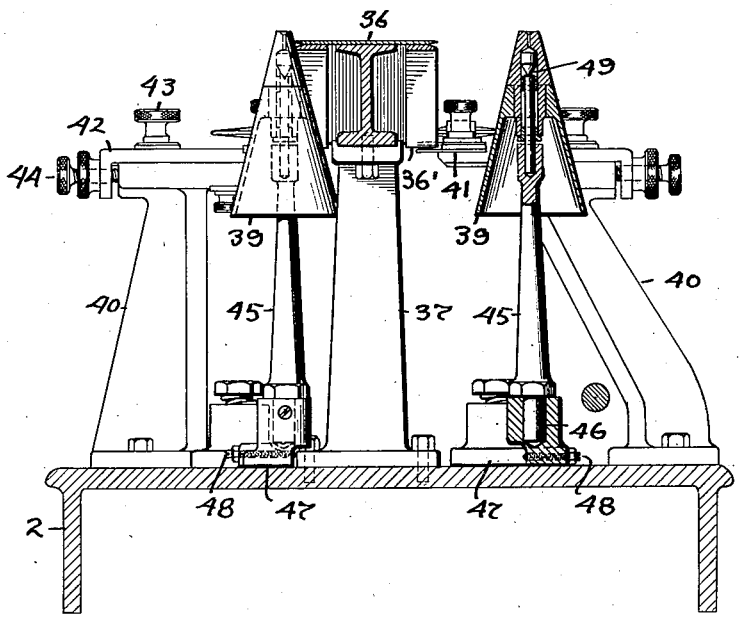

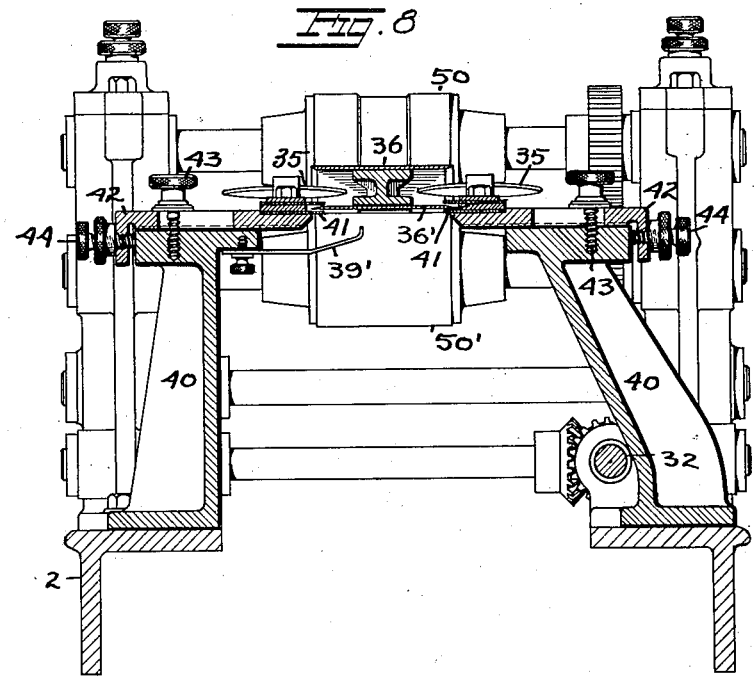
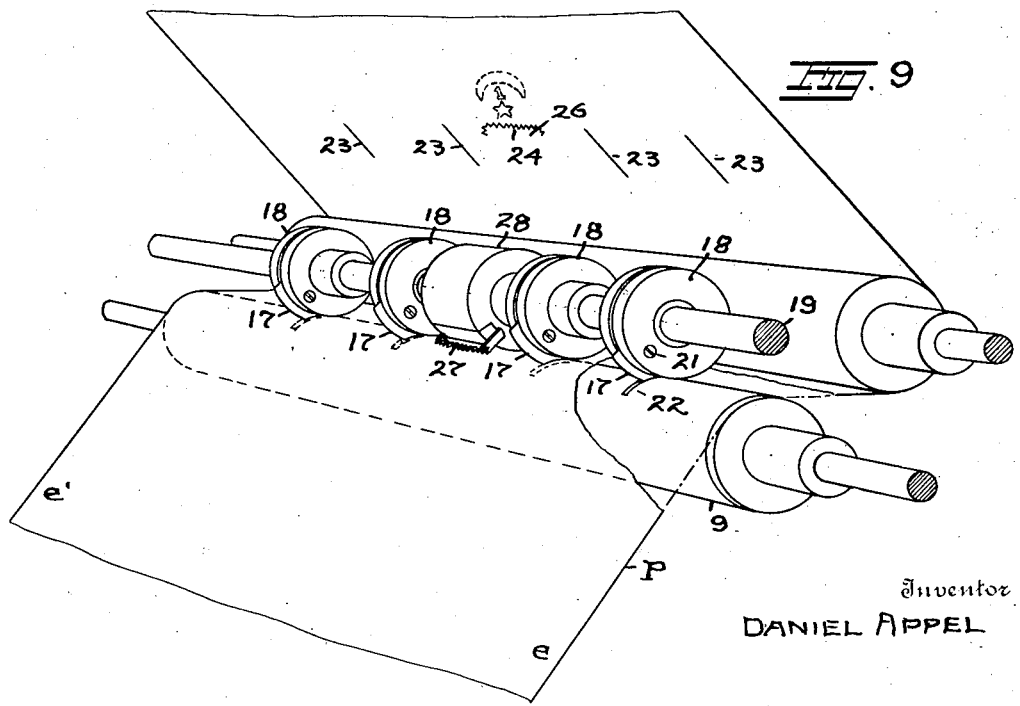

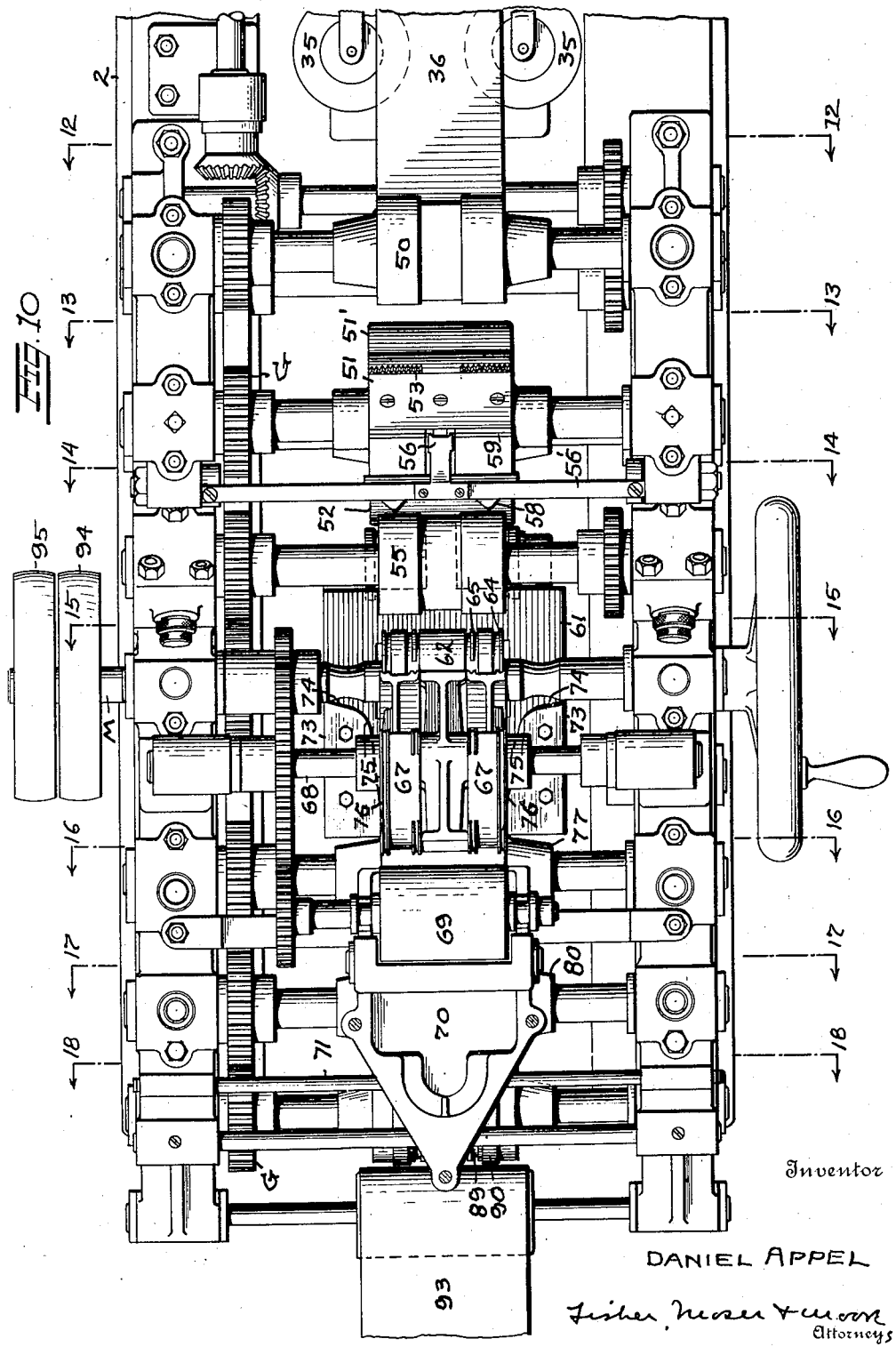

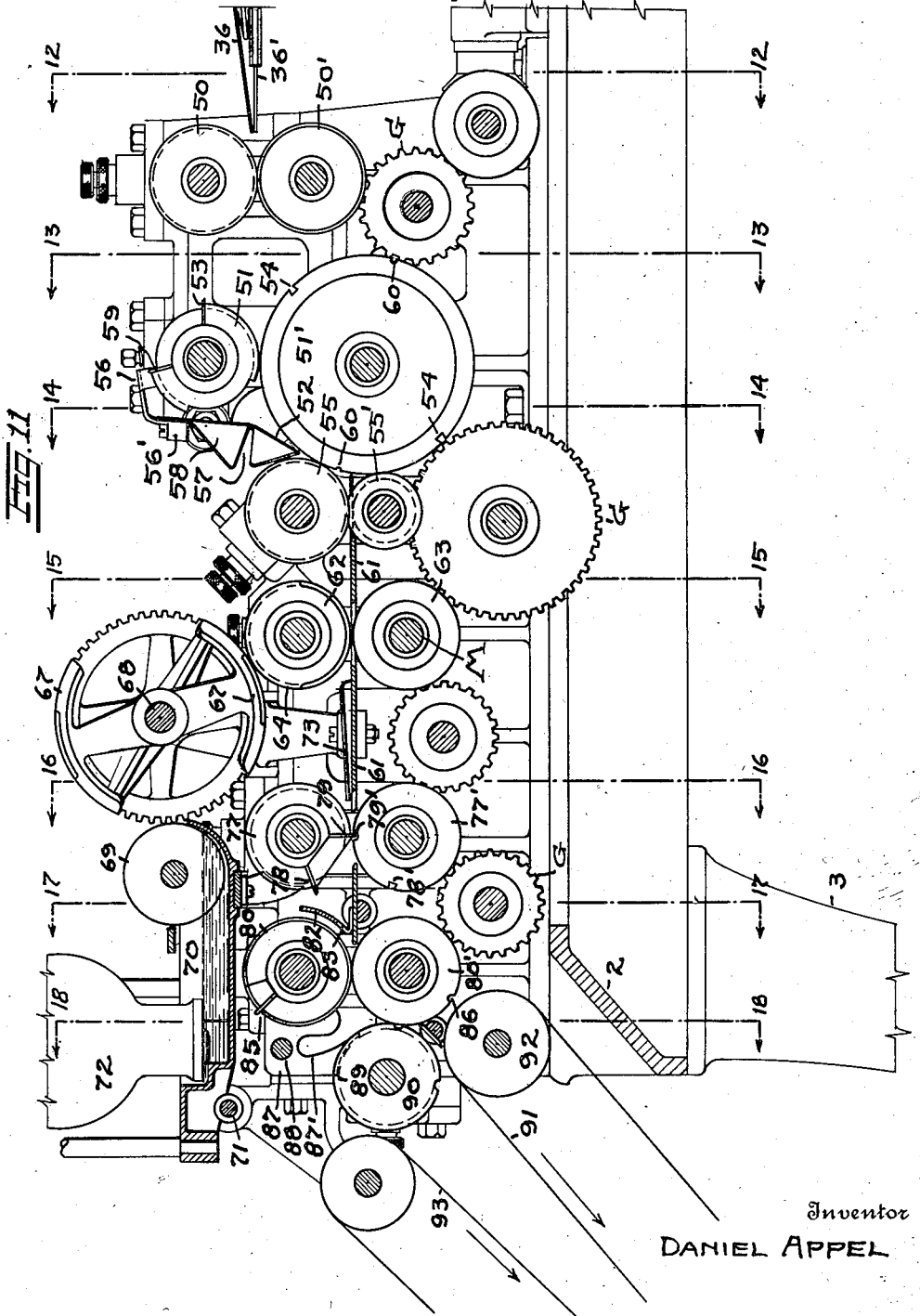

June 7, 1927.  
D. APPEL  
1,631,452  
MACHINE FOR MAKING PAPER BAGS  
Filed Sept. 18, 1924   20 Sheets-Sheet 11

Inventor  
DANIEL APPEL

By *Fisher Mason Moore*  
Attorney

June 7, 1927.

D. APPEL 1,631,452

MACHINE FOR MAKING PAPER BAGS

Filed Sept. 18, 1924  20 Sheets-Sheet 12

Inventor
DANIEL APPEL

June 7, 1927.   D. APPEL   1,631,452

MACHINE FOR MAKING PAPER BAGS

Filed Sept. 18, 1924    20 Sheets-Sheet 13

Inventor
DANIEL APPEL

By Fisher, Moser & Moore
Attorneys

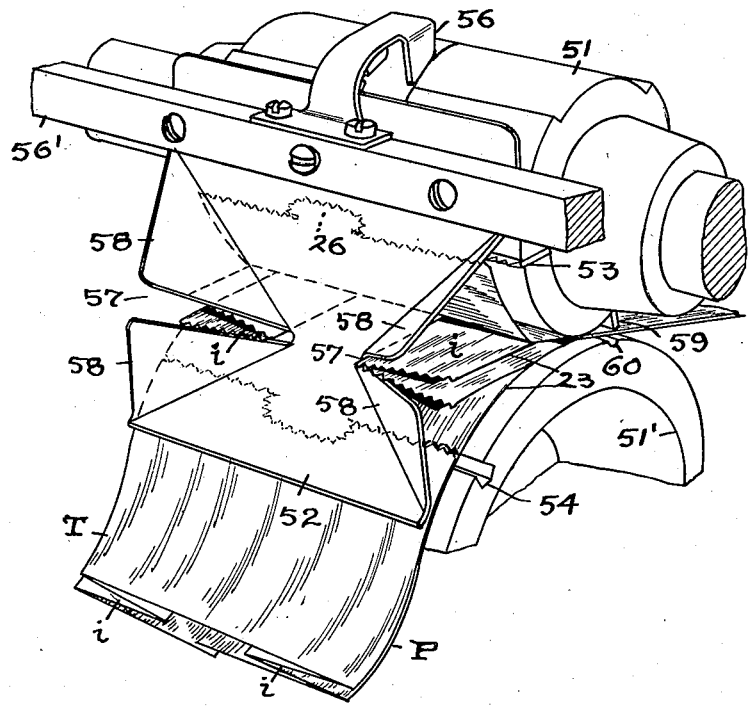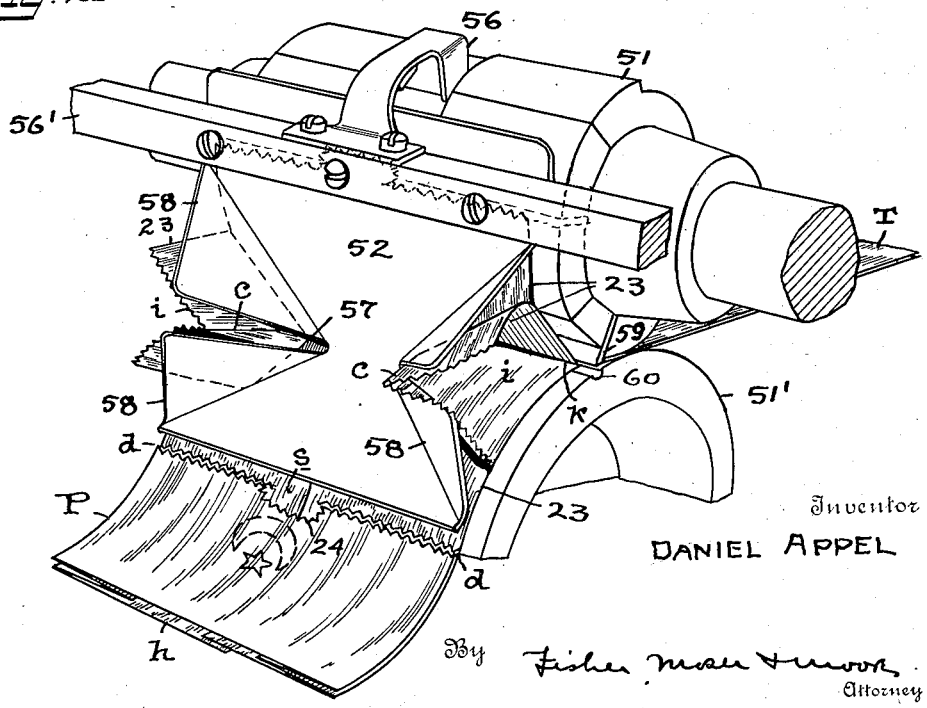

June 7, 1927.  D. APPEL  1,631,452
MACHINE FOR MAKING PAPER BAGS
Filed Sept. 18, 1924  20 Sheets-Sheet 15

Inventor
DANIEL APPEL

June 7, 1927.
D. APPEL
1,631,452
MACHINE FOR MAKING PAPER BAGS
Filed Sept. 18, 1924 20 Sheets-Sheet 16
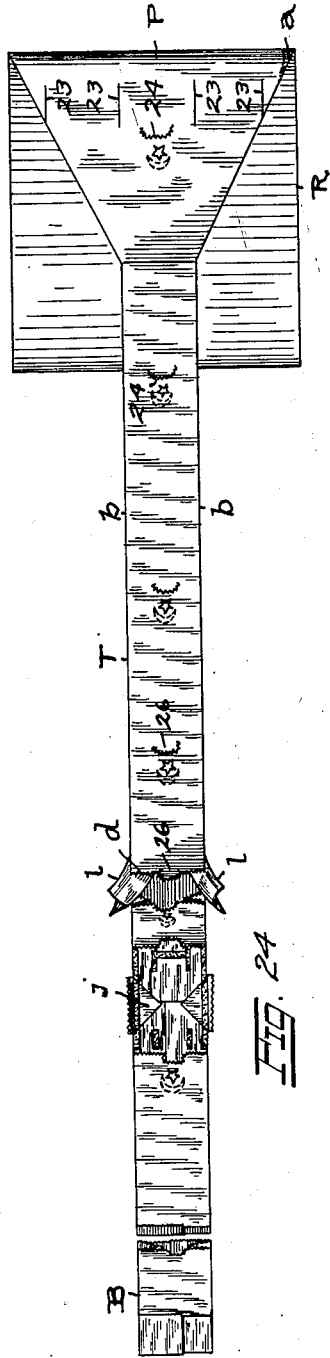
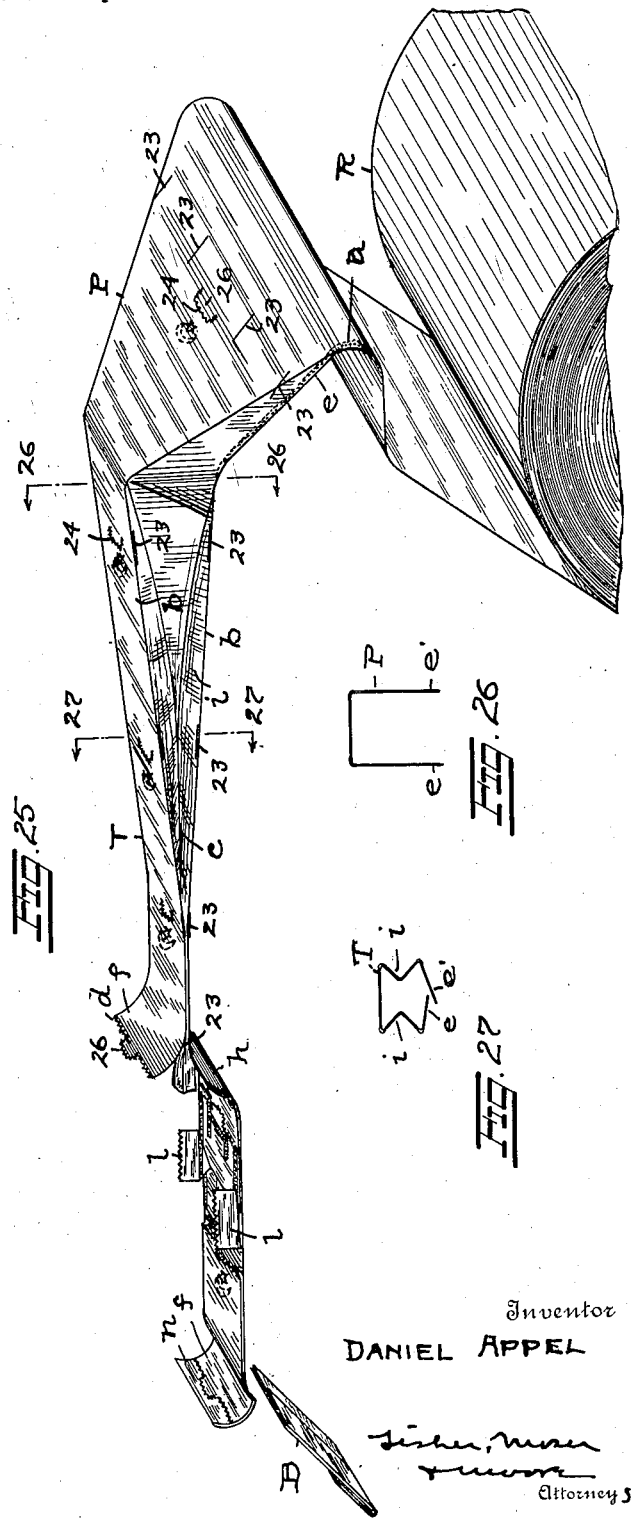
Inventor
DANIEL APPEL
Attorneys June 7, 1927. 1,631,452
D. APPEL
MACHINE FOR MAKING PAPER BAGS
Filed Sept. 18, 1924  20 Sheets-Sheet 17
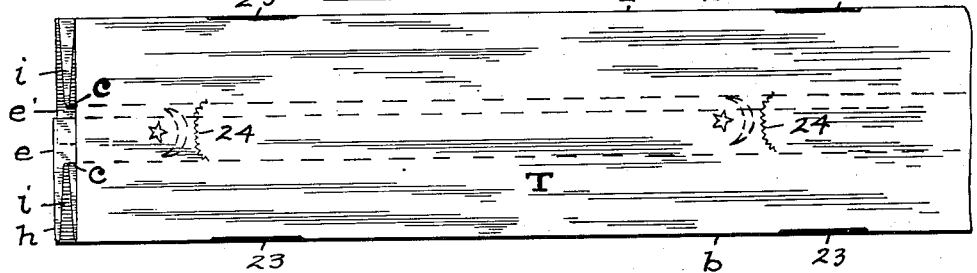
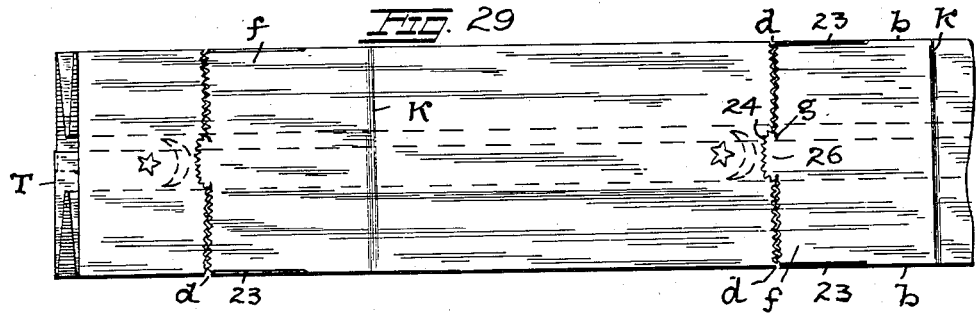
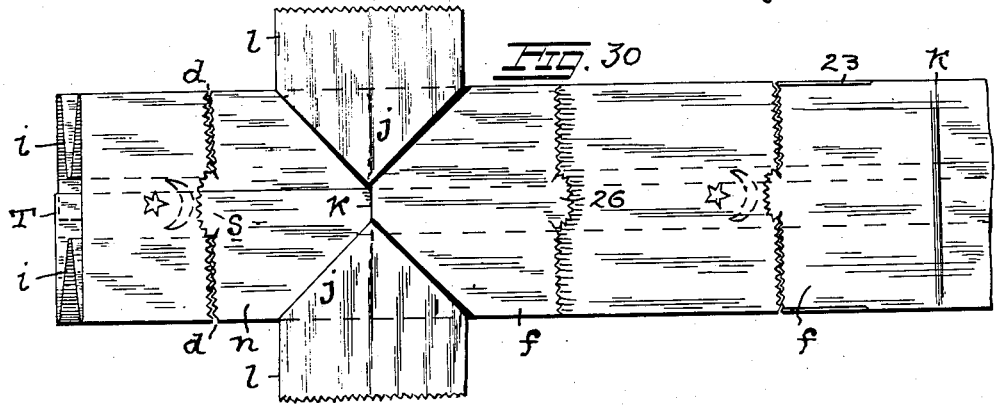
Inventor
DANIEL APPEL June 7, 1927.
D. APPEL
1,631,452
MACHINE FOR MAKING PAPER BAGS
Filed Sept. 18, 1924  20 Sheets-Sheet 13
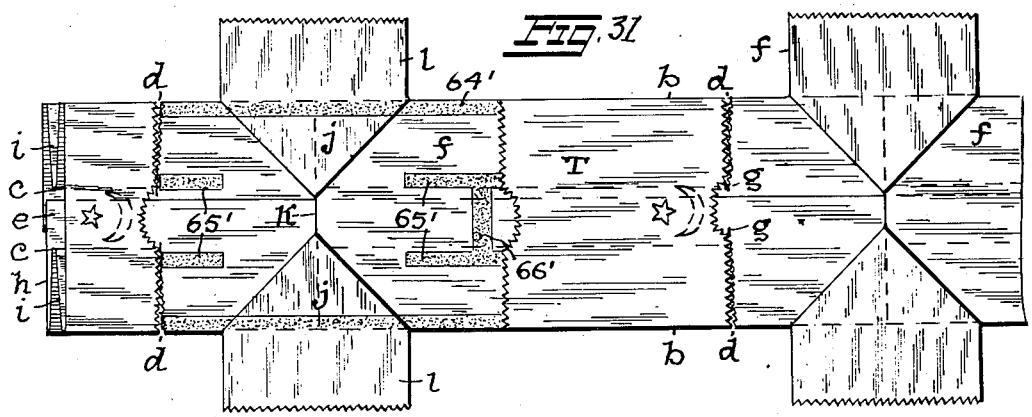
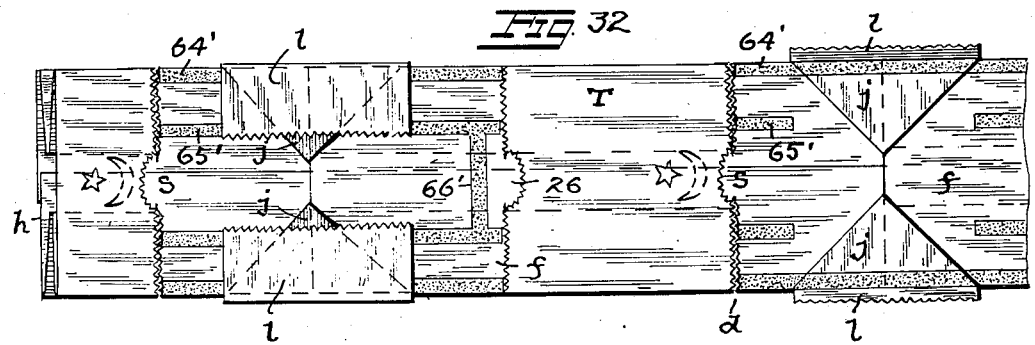
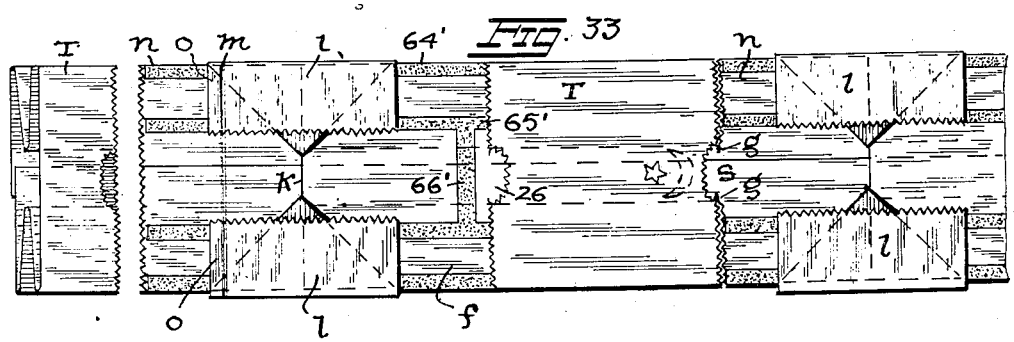
Inventor
DANIEL APPEL June 7, 1927. 1,631,452

D. APPEL

MACHINE FOR MAKING PAPER BAGS

Filed Sept. 18, 1924  20 Sheets-Sheet 19

Inventor
DANIEL APPEL
By Fisher, Moser Hoover
Attorney

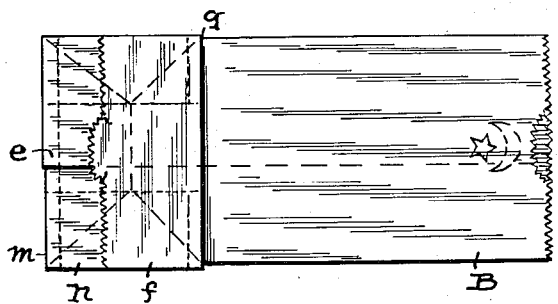
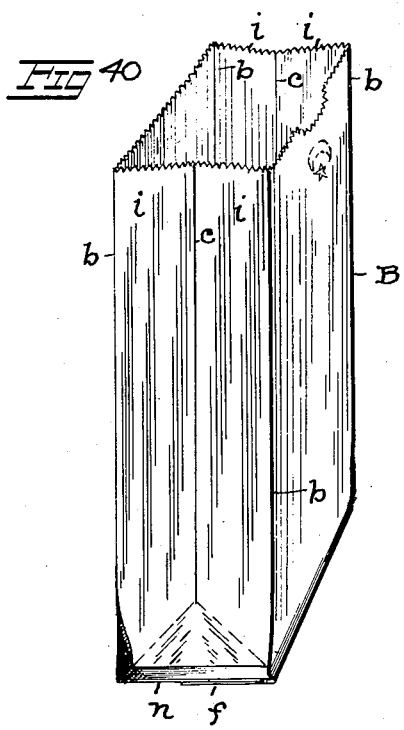
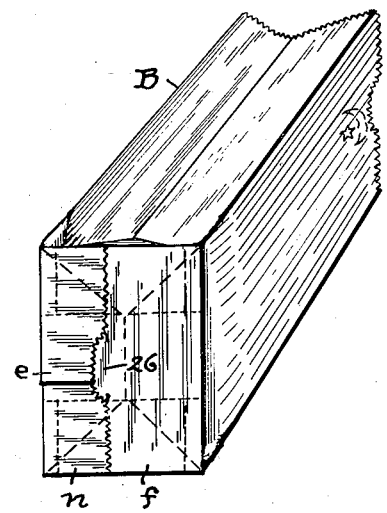

Patented June 7, 1927.

1,631,452

UNITED STATES PATENT OFFICE.

DANIEL APPEL, OF CLEVELAND, OHIO, ASSIGNOR TO THE CLEVELAND-AKRON BAG COMPANY, OF CLEVELAND, OHIO, A CORPORATION.

MACHINE FOR MAKING PAPER BAGS.

Application filed September 18, 1924. Serial No. 738,537.

My invention relates to an improvement in a machine for producing paper bags, and in general my object is to provide a high speed machine adapted to produce a square bottom paper bag such as disclosed in my Letters Patent of the United States No. 1,484,383, dated Feb. 19, 1924.

In the accompanying drawings, Fig. 1 is a side elevation of my improved machine, and Fig. 2 is a sectional view longitudinally of the machine at one side of the main operating parts. Fig. 3 is a top view of the machine, and Fig. 4 a similar view, enlarged, of the paper slitting and tube forming mechanism. Fig. 5 is a sectional view and side elevation of the machine parts shown in Fig. 4. Fig. 6 is a vertical section transversely of the machine on line 6—6 of Fig. 5, and Fig. 7 is a similar cross section on line 7—7 of Fig. 5. Fig. 8 is a vertical cross section on line 8—8 of Fig. 5. Fig. 9 is a perspective view of the slitting and cutting rollers operating upon a strip of paper. Fig. 10 is a top view of approximately one-half of the machine, enlarged as compared with Fig. 3, comprising the bottom folding and forming mechanism, and Fig. 11 is a vertical section longitudinally of the same mechanism.

Fig. 12 to 18, inclusive, are vertical sections transversely of the machine on lines 12—12, 13—13, 14—14, 15—15, 16—16, 17—17 and 18—18, respectively of Fig. 11.

Figure 19:
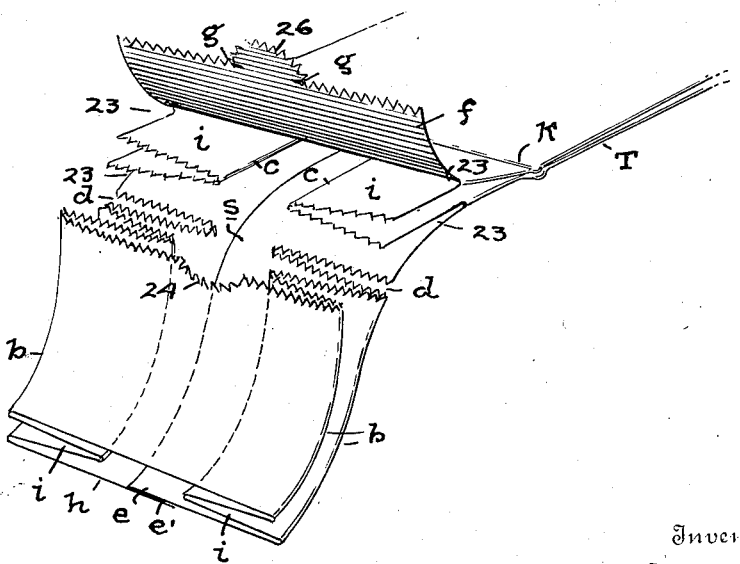
Figure 22:
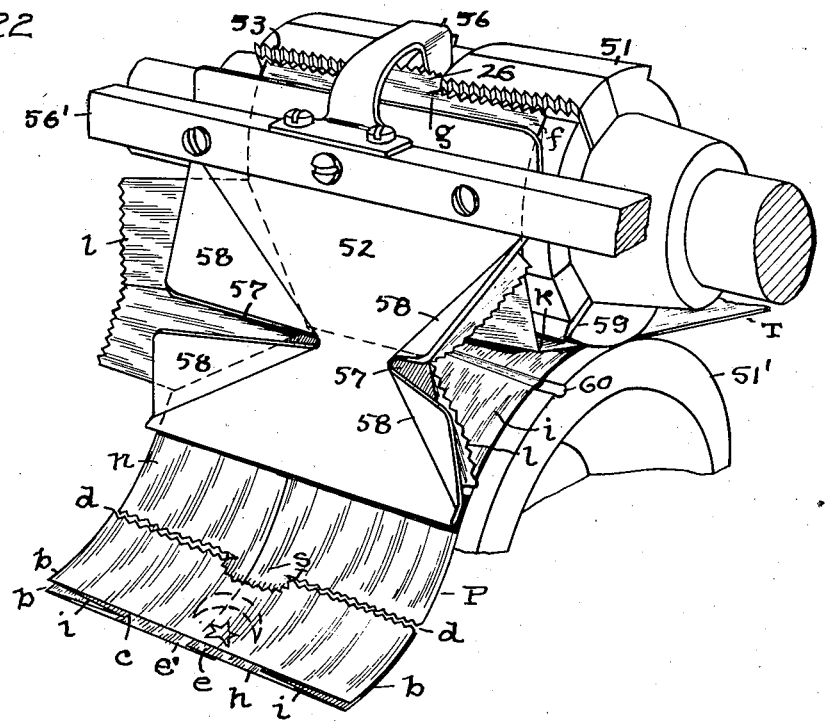
Figure 23:
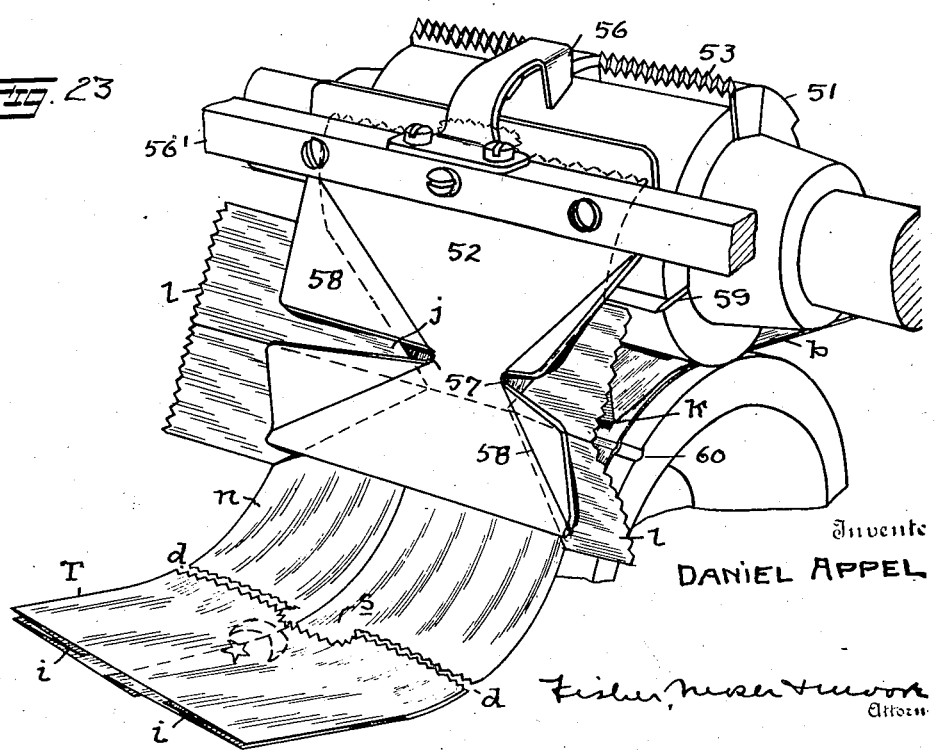
Figure 34:
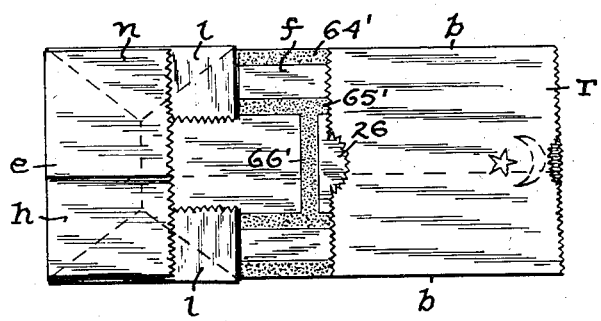
Figure 35:
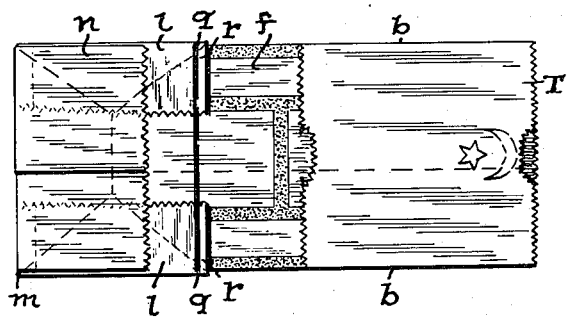

Fig. 19 is a perspective view of a sectional portion of the paper as it appears just before the triangular folds are produced therein.

Figs. 20 to 23, inclusive, are perspective views of the triangular fold forming mechanism, showing the development of the fold progressively during the travel of the paper through said parts. Fig. 24 is a plan view, on a reduced scale, of the paper alone as it appears in one stage of operations while passing through the machine, and Fig. 25 is a perspective view thereof.

Figure 36:
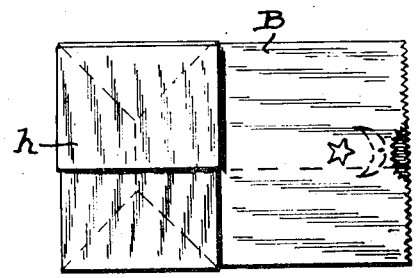
Figure 37:
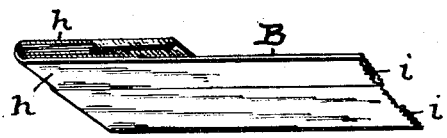
Figure 38:
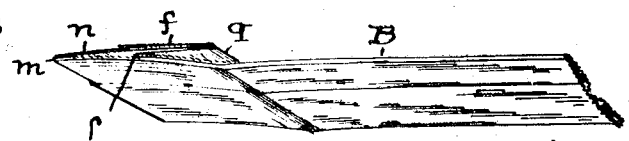

Figs. 26 and 27, are cross sectional views on lines 26—26 and 27—27, respectively, of Fig. 25. Figs. 28 to 35, inclusive, are plan views of the plicated tube showing the various formations which take place therein in producing a finished bag, and Fig. 36 is a plan view and Fig. 37 a perspective view of the completed bag doubled upon itself, as occurs when the bag is being discharged from the machine. Fig. 38 is a perspective view of the bag unfolded, and Fig. 39 is a top view of the same bag flat and unopened as shown in Fig. 38. Figs. 40 and 41 are perspective views of the same bag opened.

The machine herein described is particularly constructed to produce a folded paper bag having a flat bottom adapted to permit the bag to stand squarely upright and fully open when unfolded. Outwardly the bag has the appearance of other paper bags of this type, but it differs therefrom in several important particulars, reference being had to my Letters Patent mentioned in a preceding paragraph. Thus in devising the patented bag I had in general the following conception and purpose, namely, to permit its production at very high speed in a machine and to produce a durable and strongly sealed bottom; and in correlation with that conception and purpose I had other ideas involving the particular method to be practiced and the specific machine to be used in making the bag.

The present application relates to the machine, which structurally considered, comprises a rectangular main frame 2 having corner legs 3, two of which carry brackets 4 adapted to removably support the projecting ends of a shaft 5 for a large roll of paper R. A brake member or arm 6 is pivotally suspended from frame 2 to retard the rotation of the roll and keep the paper under tension as it passes through the machine, and the tension may be varied by adjusting a weighted member 7 connected with the supporting shaft 8 for said arm. The paper as it unwinds from the roll passes upwardly around a hollow roller 9 journaled at its opposite ends in the frame, and thence horizontally toward and around an idler roller 10 situated upon the top of the frame adjacent a paste pot 11 having a thin paste applying wheel 12 therein, whereby a narrow band of paste may be continuously transferred to the face of paper P near one longitudinal edge thereof. Paste pot 11 is removably seated upon a pair of parallel cross rods 14, and paste wheel 12 is supported upon a pivoted arm 15 having a tension spring 16 connected to one of said rods.

The wide sheet of paper in passing around hollow roller 9 is engaged intermittently by a series of thin cutting blades 17 clamped removably between separate pairs of disks 18 mounted upon a revoluble shaft 19 extending parallely above roller 8. Each blade 17 has a forked inner end 20 adapted to permit the blade to engage shaft 19 and fix the radial setting of the blade, and a clamping screw 21 passes through the blade and clamps it removably in place between the disks. The circular cutting edge of the blade extends beyond the periphery of the disk, and hollow roller 9 is provided with a series of slots 22 adapted to receive the projecting blades and cause a shearing cut in the paper where the companion blades and slots register. The slits 23 extend longitudinally of the sheet or strip of paper and four such slits are produced at spaced intervals transversely of the sheet, and in addition a serrated opening 24 is made transversely of the sheet midway of the inner slits. Serrated opening 24 may be on a curved line or the opposite ends may be sharply curved to produce a free lip 26 in the paper, and in a subsequent operation the opposite ends of the lip are incised at their base by other serrated knives to produce short hook-like extremities adapted to cling to said knives while they rotate and until stripped therefrom. The curved serrated opening 24 is made by a serrated cutter 27 of corresponding form, and this cutter is removably secured within the circular face of a collar 28 which is fixed on shaft 19 midway between the inner pair of slitting blades 17. Collar 28 may also have an embossing die 29 inset therein to produce a trade-mark or other character in the paper adjacent serrated opening 24. The shafts for roller 9 and slitting blades 17 are rotated in opposite directions by meshing gears 30, and upper shaft 19 is driven by bevel gears 31 deriving their power from a countershaft 32 journaled in brackets at the top of frame 2.

After the sheet of paper is cut and slitted as described, it passes around idler roller 10, where a streak of paste —a— is applied to one border by wheel 12, and then the sheet of paper is folded into a flat plicated tube T having four outer fold lines or edges B. These four longitudinal fold lines are co-incident with the four parallel slits 23, and therefore when the tube is completed these slits are located in the four border edges of the tube. The stock between the slits at each side of the tube is folded inwardly and an inner fold line c is produced. These side plications or folds are made as the sheet of paper passes lengthwise of a tube-forming device mounted upon a vertical standard 37 bolted to the top of frame 2. This device comprises a pair of flat forming plates 36—36' arranged one above the other in spaced converging relation, and includes a pair of rotatable disks 35 adapted to be removably and adjustably seated in a substantially horizontal plane between the converging ends of said forming plates. Upper plate 36 has a downwardly-inclined extension 38 which projects toward idler roller 10 to guide the paper upwardly. Both plates are considerably narrower than the sheet of paper, consequently as the paper travels to a higher elevation and passes over the angular bend in upper plate 36 the unsupported sides of the sheet of paper droop or bend downward, and this self-folding movement is augmented and the sides inclined inwardly toward each other by passing the dropped sides of the paper around two vertical cones 39—39 which have their smaller ends placed closely adjacent the corner edges of the angular bend in plate 36 at the highest point of travel of the paper. The larger ends of the cones extend underneath the side edges of plate 36 to assist in bringing or leading the folded sides of the sheet of paper into overlapping relation, and the placement of one bottom flap —e— underneath the other bottom flap e' may be further induced by a spring finger 39' attached to one of the brackets 40 carrying a folding disk 35.

Folding of the sheet into a plicated tube also involves the use of a channeled member 41 opposite each folding edge of lower plate 36', see Figs. 4 and 8. Member 41 comprises two blades which are tapered lengthwise and spaced apart to provide a channel of graduated depth adapted to receive the edge of former plate 36', and each channeled member 41 serves to wipe and to develop an outer fold line or edge b in the tube at each side edge of bottom plate 36'. The rotating disks 35 for developing the inner fold line c of the interfolded stock or plicated sides of the tube are mounted upon members 41, which in turn are supported upon a slotted holder 42 shiftably mounted upon the flat tops of brackets 40 and secured thereto by clamping screws 43. A set screw 44 at the outer end of holder 42 may be used to fix the working position of the channeled edge of the holder relatively to the folding edge of plate 36'.

The working position of each revoluble cone 39, relatively to upper plate 36, may be finely adjusted by rotating the supporting post 45 which has an eccentric base extension 46 seated in a socket at the movable outer end of a swinging arm 47 pivotally mounted upon the table or top of frame 2. In Fig. 7, one arm and post is shown as shifted to one side with the cone spaced apart from the forming plates, a setting which permits the sheet of paper to be draped upon the forming device or to be removed therefrom whenever necessary. A set screw 48 extending through arm 47 is adapted to engage the base of a standard 37 and limit the inward movement of the cone relatively to the folding edge of upper plate 36, and the cone has a point bearing 49 within its upper end adapted to permit the cone to rotate very freely and prevent drag or retardation of speed of the paper.

The paper is drawn lengthwise over the tube forming device by a pair of feed and presser rolls 50—50' situated opposite the converging end of the former plates 36—36' and the middle portion of upper roll 50 is grooved or channeled to prevent the spreading of the paste beyond the edges of the overlapping flaps of the tube, especially if there should happen to be an excess of paste at some place in the line of paste —a— applied by wheel 12; it being further understood that an overflow of paste inside of the tube might cause the opposed walls of the tube to adhere together and interfere with subsequent operations involving the rapid formation of the bags successively from the tube without completely severing each bag from the tube until the folding and sealing of the flat bottom of the bag has been practically completed. Thus in operations a pulling tension is maintained on the sheet of paper and tube substantially throughout the length of the machine, and when the tube passes from the tube forming device into rolls 50—50' the creased border edges of the tube are pressed flat and sharply defined before the tube passes onward and enters a second pair of rolls 51—51' adapted to co-operate with a stationary plate 52 in forming triangular folds in the plicated sides of the tube where slitted longitudinally.

Upper roll 51 is of smaller diameter than roll 51' and carries a serrated cutting blade 53 lengthwise thereof adapted to enter a registering slot 54 in the circumference of larger roll 51', said rolls being timed to rotate together with that end in view. The middle portion of cutting blade 53 is minus cutting teeth and is made blank to provide in effect two separated cutters adapted to incise the tube transversely in its plicated portions only, the cuts d extending inwardly from the outer edges where the slits 23 begin but not entirely across the tube in order that a narrow connecting strip s be permitted to remain in one wall of the tube and preferably in the bottom wall where the overlapping flaps e—e' are pasted together and form a double-thickness of paper capable of withstanding the pulling strains on the tube. However, the upper wall of the tube is severed entirely across the tube because the divided cutting blade 53 is caused to coincide with the curved ends of the serrated opening 24 formed previously in the paper by cutter 27. On the other hand the part f severed in the upper wall of the tube by the divided cutting blade 53 is not permitted to free itself from the serrated blade but is made to cling to the inner serrated ends of the blade, this result being obtained by making the blank space at the middle of the blade of less length than the curved opening 24 in the paper. In this way the inner ends of the serrated cutting edge of blade 53 produce a cross cut —g— at the base ends of opening 24 and the lip 26 is caught up by the innermost cutting teeth and carried upwardly around upper roll 51 as said roll revolves. This proceeding lifts the loose flap f in the top wall of the tube, while coincidently the lower wall h of the tube is being drawn downwardly around the circumference of larger roll 51' by a pair of feed rolls 55—55' operating in a lower plane than the horizontal plane of travel of the tube up to that point. This diverging travel of the top and bottom walls of the tube is permitted because the tube is slitted at its outer border edges, but the limit of divergence without tearing is dependent upon the length of such slits, and consequently lip 26 is released at an appropriate time by a stripping finger 56 set in the path of rotation of the lip. However other results follow before such release is effected; thus when the top and bottom walls of the tube separate where severed transversely, the plicated sides i—i lying between such walls continue to travel horizontally in a straight line toward transverse slots 57 in an intercepting plate 52 which is suspended in a vertically-inclined position opposite roll 51 from a cross bar 56', see Figs. 14 and 20. The slots 57 in plate 52 extend inwardly toward the middle of the plate to permit the plicated portions i—i of the tube to partly enter the same, and the divided portions of the plate contiguous to these slots are bent outwardly on diagonal lines beginning at the inner ends of the slots and terminating at the corners of the plates, thereby providing a pair of slanting wings 58 of triangular shape at each side of the path of the tube. This simple device serves to form a triangular fold j at each side of the tube but only in the plicated portions of the tube. Thus as the top and bottom walls of the tube spread apart the plicated portions i—i enter the slots in former plate 52, and at about the same time a creasing blade 59 in upper roll 51 engages the tube and presses the paper in a registering groove 60 in larger roll 51'. During this interval and for a short interval thereafter the severed top flap f picked up by the divided cutter 53 is curving upwardly around roll 51 thus checking the forward movement of the straight plicated portions i—i of the tube, and the lower wall h of the tube in passing downwardly around larger roll 51' is asserting itself equally to that end. Such check in the travel of the plicated portion is largely centered at its inner fold line c while the outer fold lines or edges a of the tube are being separated from one end of the transverse incisions d in the tube to the creased line $k$ formed by creasing blade 59. The slits 23 in the outer fold lines or edges of the tube extend only half-way from the transverse incisions to the creased line $k$ and consequently as the outer side edges of the tube separate the free interfolds begin to separate and new folds on triangular lines are created in the plicated sides of the tube, beginning at the closed end of the slits and terminating eventually at the inner fold line where intersected by the crease. In this proceeding the free plicated portions $i$—$i$ are opened up and wiped flat by engagement with the edges of the slots and the slanting faces of the wings 58, it being borne in mind that the tube is always traveling forward while the rolls are revolving in opposite directions and that the creased part $k$ of the tube is being drawn onward while the unfolding of the plicated portion is in progress. Thus as the creased part of the tube advances toward the wiping wings 58 the top wall of the tube buckles downward and follows the lower wall of the tube around the circumference of lower roll 51', but this movement is not very pronounced until the stripper finger 56 releases lip 26 and permits the upwardly turned flap $f$ of the tube to follow the buckled portion downward. Then as this movement continues the unfolding of the free plicated portion of the tube continues until such portions extend as lateral flaps $l$ beyond the outer side edges of the tube and are pressed flat. The triangular fold is now complete but only on soft fold lines, but these lines are hard pressed in passing between feed rolls 55—55'.

The inner flat bottom for the bag is now formed and this partially-completed bag section is still attached by the narrow connecting strip $s$ to a similar section which has been formed previously and passed onward through feed rolls 55—55', note being taken that the tube is under tension and being pulled onward by other rolls besides feed rolls 55—55'. In this way the partially completed section is delivered from rolls 55—55' over a flat table 61 to a set of pasting rolls 62 and 63. The inner face of the bottom wall of the tube from the transverse incision $d$ to the transversely creased fold line $k$ is exposed to the upper ribbed roll 62, the lateral side flaps $l$ having the triangular fold lines diverging from the creased line are also exposed to the same pasting roll, and the inner face of the top wall of the tube is exposed in the same manner, being inverted and folded flat upon the top of the main body of the tube. Pasting roll 62 is formed with two pairs of curved segmental ribs 64 and 65 of different length and a cross rib 66 which apply narrow bands of paste longitudinally and transversely of the exposed faces of the tube described. The longer bands of paste 64' extend along the border edges of the tube and over the exposed lateral flaps and across the corners of the triangular folds; the shorter longitudinal bands of paste 65' extend parallel with the border edges of the tube, but spaced inwardly therefrom and only partly over the exposed faces of the bottom wall and the inverted flap $f$ of the top wall of the tube. The transverse band of paste 66' is also applied to the inverted flap $f$ intermediate the inner bands of paste and closely adjacent the serrated incision $d$ and lip 26, see Fig. 31. The paste is transferred to roll 62 by segmental members 67 mounted upon a rotatable shaft 68 and having ribbed and channeled surfaces adapted to register with the pasting ribs 64, 65, and 66 in the rotative movements of the parts, and the paste transferring segments 67 in their revolutions receive the paste from a paste delivery cylinder 69 which revolves in one end of a paste receptacle 70 seated removably upon suitable cross supporting bars 71 at the top of the machine. A level supply of paste may be maintained within receptacle 70 by stationing a bottle of paste 72 in an inverted position within the receptacle. The paste transferring structure described exemplifies one form of device which may be used, but I do not wish to limit myself solely thereto inasmuch as the paste may be continuously supplied to roll 62 in other ways.

Following the pasting operation the next step involves the turning of the lateral flaps $l$ of the tube inwardly upon the triangular folds $j$ and the bands of paste 64' thereon as delineated in Fig. 32. This result is produced as the tube is drawn forward by causing the lateral flaps $l$ to engage a pair of turn plates 73 which are affixed in horizontally-inclined position above table 61 directly in the line of movement of the laterally-extending flaps. The transverse intercepting edge 74 of each plate 73 is inclined relatively to the line of travel of the tube and lower roll 63 is ribbed at its opposite ends to effect an initial lifting and turning movement of the flap $l$, and the corner 75 is rounded to carry this turning movement forward while the inner longitudinal edge 76 of the plate inclines still further toward the longitudinal medial line of the tube to complete the turning movement of the flap $l$ downward upon the triangular fold $j$. The flap is also pressed down upon the tube as it reaches the discharge end of the turn plate because said plate slopes downwardly toward the table to narrow the exit end vertically for that purpose.

The folding of the lateral flaps $l$ inwardly having been accomplished, the next step in operation as the tube passes from the turn plates is to sever the narrow connecting strip $s$ and to impress a folding crease $m$ transversely of the tube parallel with the transversely severed edge but sufficiently remote therefrom to provide a bottom fold or flap $n$ adapted to be turned over upon the infolded side flaps $l$, see Fig. 33. The transverse folding crease $m$ is also impressed across the inturned side flaps parallel with and closely adjacent the straight edge thereof so that a narrow part $o$ of the side flap is folded upon itself and a re-enforced fold line for the bottom of the bag is produced. In addition the outer corner of the triangular fold is also creased and folded over which assures a perfectly sealed multi-ply corner for the bottom of the bag. Thus as soon as the side flaps have been turned inward the tube section, still attached to the preceding section by connecting strip $s$, passes between another set of rolls 77—77'. The upper roll 77 carries a short cutter 78 centrally between its ends which are channeled to avoid engagement with the paper where pasted, and this cutter is adapted to register with a facial groove 78' in lower roll 77' when said rolls are revolving, the rotary movement being timed to shear or sever the connecting strip $s$ as it passes between the rolls. The bag section which is completely severed passes through another set of creasing rolls 80—80', while coincidently an attached section of the tube is passing between rolls 77—77' where it will be creased by a creasing blade 79 carried by roll 77. This blade registers with a groove 79' in lower roll 77', and develops the first transverse crease $k$ in the folded side flaps and bottom wall of the tube as described. In developing the transverse crease $k$, the end flap $n$ which has just been severed springs upwardly and strikes a curved intercepting plate 82 having a slot 83 at its base through which the main body of the tube may travel, thereby folding the end flap $n$ upon the infolded side flaps $l$ before the tube enters rolls 80—80'. Upper roll 80 is channeled annularly to provide annular rolling ribs 84 adapted to press the folded end flap $n$ down upon the folded side flaps $l$, and said rolling ribs engage the paper intermediate the longitudinal bands of paste to avoid spreading and transfer of the paste from the tube to said roller.

The function of rolls 80—80' is to impress an additional folding crease $q$ transversely in the tube at the base of the loose top flap $f$ which still remains to be folded to complete the flat bottom of the bag, and these rolls are also used to feed the creased product into other folding and pressing devices. Thus, upper roll 80 is provided with a creasing blade 85 adapted to register with a shallow groove 86 in lower roll 80', the operation being timed to impress the paper tube transversely on a straight line $q$ parallel with the uncovered straight edges of the inturned side flaps and closely adjacent said straight edges so that a narrow part $r$ of each side flap will be folded upon itself when the final bottom flap is folded. This final fold places the flap $f$ in an overlapping position upon the serrated end of the pasted bottom flap $n$ previously operated upon by curved plate 82. The crease $q$ extends across the outer corners of the triangular fold so that a multiple number of thicknesses of paper will be folded upon each other at the corners of the finished bottom of the bag, a development corresponding to the other corners previously produced in the tubular section being operated upon.

The final fold is made by shunting the folded end of the tubular section into a stationary set of slotted plates 87 suspended in a vertical position from a cross rod 88 opposite the discharge side of roll 80. The lower ends of plates 87 extend into annular grooves 89 in a rotatable roll 90 which revolves opposite lower roll 80' and is adapted to co-act therewith to complete the final fold and to deliver the folded product B to an endless belt 91 which passes around a smooth pulley 92 located closely adjacent to rolls 81' and 90, respectively. The slots 87' in plates 87 curve upwardly to direct the folded end of the bag section upwardly at a diverging angle to the horizontal plane of travel of the main body, thereby causing the bag section to buckle downward where last creased and to pass in this buckled condition into the bite of the two rolls 80' and 90. As a result the folded end of the bag section is pressed back upon the pasted side of the final fold or flap $f$ as it issues from upper roll 80 and curves downwardly around the circumference of lower roll 81. The serrated edges of the two bottom folds of the bag B are now overlapped and united and the bag bottom practically completed when delivered by rolls 80' and 90 upon belt 91, except that the pasted faces have only been soft pressed together. The bags are made and issue so rapidly that it has been found desirable to delay hard pressing and keep the paste from spreading to exterior and interior parts of the tube and bag and to the machinery. The final pressing is therefore accomplished subsequent to the discharge of the bag from rolls 80' and 90, either by passing the bag B between flexible belts or through rolls. It is also desirable to unfold the bag from the doubled state in which it is delivered to belt 91, and this is accomplished and the bag flattened out for compactness in shipment by mounting a second endless belt 93 in an inclined position opposite the upper stretch of belt 91 and driving this upper belt at faster speed than the lower belt. Thus, when the doubled product is delivered to belt 91, the folded end which has been doubled back upon the main body of the bag springs opens as soon as it is released from roll 90 and comes into contact with the faster moving belt 93 whereby this part of the bag is wiped forward and unfolded to lie in the same plane as the main body, and by passing the bag in this unfolded state between pressing belts or rolls, the completed product is pressed permanently flat from end to end.

All the movable parts of this machine involved in the formation of the bag from the beginning to the end of operations are rotatable parts moving in the same direction as the paper and the other parts which coact with these rotary devices are stationary intercepting parts. Consequently, a very high speed of operation and high output per minute becomes possible, and the life and durability and upkeep of the machine is correspondingly lowered as compared with other paper bag machines in which reciprocating or oscillating parts are constrained to function. The driving mechanism for this machine is also simplified, and consists of a simple train of spur and pinion gears G mounted upon the respective shafts of the rotating parts and located mainly at one side of frame 2 adjacent the boxes or bearings for the shafts. The train of gearing is operated from a main power-shaft M having a pair of fixed and loose pulleys 94—95 thereon, but the machine may be motor driven if desired. The train of gearing being obviously simple and the various shafts and rolls being mainly parallel a detailed description thereof is omitted. However it will be understood by those skilled in mechanics that the arrangement and ratio of the gears permit the various rolls to rotate at the proper speed and to time the movements of the working parts so that the sheet of paper and the tube may be under proper tension and the successive folding and pasting operations may proceed at high speed. Reference may also be had to my companion application for patent, for a process of making paper bags, the present machine being one exemplification of a preferred form of apparatus for practicing that process.

What I claim is:

1. A machine for making paper bags, comprising means for slitting a strip of paper longitudinally at spaced intervals, means for producing a plicated tube from the slitted paper, said means being adapted to form the fold lines of the tube on lines coincident with the longitudinal slits in the paper, and means for producing completed bags from each slitted section of the tube.

2. A machine for making paper bags, comprising cutting devices adapted to slit and sever a plicated tube longitudinally and transversely at intervals, a stationary device adapted to form triangular folds in said tube where slit and severed, and means adapted to draw said tube into wiping engagement with said device to produce a partially developed bottom for a bag, in combination with folding and pasting devices for completing said bottom and the bag.

3. A machine for making paper bags, comprising a series of rotary slitting cutters, a device situated adjacent said cutters adapted to form a plicated tube from a sheet of paper acted upon by said cutters, and a series of rotary bag-bottom forming rolls and stationary intercepting devices adapted to receive said tube and develop flat-bottom bags successively therefrom.

4. A machine for making paper bags, comprising a series of rotatable cutters adapted to slit a sheet of paper longitudinally thereof, a device adapted to form a plicated tube from said sheet of paper, and means adapted to produce bags having flat bottoms successively from said tube, said means including feed rolls adapted to draw said paper in engagement with said cutters and over said forming devices.

5. In a machine for making paper bags, paper slitting means comprising a series of rotary cutting blades removably clamped between disks mounted upon a rotatable shaft, and a co-acting roller opposite said cutting blades.

6. In a machine for making paper bags, paper slitting means comprising a series of cutting blades adapted to slit a sheet of paper parallelly at spaced intervals, a co-acting roller having slots adapted to register with said blade, said blades being removably mounted upon a rotatable shaft.

7. In a machine for making paper bags, paper slitting means comprising a pair of rotatable cutting devices, one of said devices having a shaft and spaced clamping disks upon the shaft, and slotted cutting blades engaging the shaft and clamped between said disks.

8. In a machine for making paper bags, means for producing a plicated tube comprising a set of converging plates and a pair of cones opposite the side edges of said plates adapted to form a plicated tube from a flat sheet of paper traveling over said plates between said cones.

9. In a machine for making paper bags, means for producing a plicated tube comprising a pair of converging plates, revoluble cones at opposite sides of said plates, and channel members and rollers operating in association with said plates and cones adapted to form a plicated tube from a previously slitted sheet of paper traveling over and between said parts.

10. In a machine for making paper bags, means for developing a bag bottom in a plicated tube comprising a pair of rolls having cutting and creasing blades adapted to sever a slitted plicated tube transversely, and a stationary plate opposite said rolls having inclined portions adapted to form triangular folds and a partially developed bag bottom in the plicated tube including means for feeding the tube in combination with means for completing said bottom.

11. In a machine for making paper bags, means for developing a bag bottom in a plicated tube comprising a pair of rolls, one of said rolls having cutting and creasing blades, a stationary intercepting plate adjacent said rolls having divided slanting wing portions adapted to intercept and form triangular folds in a plicated tube passing through said rolls, including means for feeding the tube together with co-operating devices adapted to complete said bottom.

12. In a machine for making paper bags, means for developing a bag bottom in a plicated tube comprising a pair of rolls, one of said rolls having a cutting blade adapted to sever a plicated tube passing between said rolls, said rolls and blade being further adapted to pick up and carry a portion of the cut tube around the roll; an intercepting member for the tube opposite said rolls, adapted to form triangular folds in the plicated tube as base for the bottom, and means adapted to disengage the severed portion from the blade upon a formation of the triangular folds in combination with co-operating device to complete said bottom.

13. A machine for making paper bags, comprising a series of bag bottom forming rolls, including a cutting roll and a stationary intercepting device, adapted to form triangular folds in a slitted plicated tube, rolls adapted to apply paste across the triangular folds, a stationary intercepting device adapted to turn portions of said pasted tube upon said triangular folds, and creasing rolls and other stationary devices adapted to complete the final folds of the bag bottom.

14. A machine for making bags, comprising a pair of cutting and creasing rolls and a cooperating intercepting plate adapted to form triangular folds in a slitted plicated tube, means adapted to apply paste to said triangular folded part of said tube, and a set of rotary and stationary devices adapted to produce final sealing at the folds and a square bottom for the bag, including means adapted to sever the bag from the tube.

15. A machine for making paper bags, comprising a series of rolls and stationary intercepting devices adapted to form a paper bag having a square bottom from a plicated tube, including means adapted to double the bag bottom upon the body of the bag as it is being discharged, and means adapted to unfold and flatten said doubled bag.

16. A machine for making paper bags, comprising a pair of cutting and creasing rolls adapted to partly sever and open a plicated tube; an intercepting plate opposite said rolls adapted to co-act therewith in forming triangular folds in the plicated portions of said tube, and to form loose side end flaps bordering said triangular folds; means adapted to apply bands of paste to the exposed faces of said flaps and folds; means adapted to turn the side flaps upon the pasted triangular folds; means adapted to crease the tube transversely of the inturned side flaps and develop a transverse fold line for one end flap; means adapted to fold said creased end flap upon the inturned side folds; means adapted to form a second transverse crease across the inturned flaps and develop a second fold line for the other end flap; and means adapted to fold said end flap upon the other flaps to complete the bag bottom.

17. In a machine for making paper bags, means for producing a bag bottom in a plicated tube, comprising a pair of rolls having cutting and creasing blades adapted to partly sever a slitted plicated tube transversely and means on one roll adapted to carry only the top wall of the tube for partial rotative movement with the rolls, and a stationary plate opposite said rolls adapted to engage the plicated sides of the tube and form triangular folds and a partially developed bag bottom during each partial rotative movement, in combination with means for completing the folding of said bottom.

18. A machine for making paper bags, comprising cutting devices adapted to produce a free lip in a plicated tube, a pair of rolls having cutters adapted to incise said plicated tube transversely at the base of said lip and arranged to pick up said lip and partly carry the incised top wall of said tube around one of said rolls, a stationary intercepting member opposite said rolls adapted to cooperate with said rolls in forming triangular folds and a partially developed flat bottom from the said plicated tube, and means adapted to complete said flat bottom and produce a finished bag.

19. A machine for making paper bags from a tube having slitted plicated sides, comprising rolls for feeding the tube, a pair of rolls having means for cutting the plicated sides of the tube transversely and forming a loose flap in the top wall of the tube, means for picking up the loose flap during rotative movement of said pair of rolls, a stationary device for intercepting the slitted plicated portions of the tube during the pick-up movement of said flap and for wiping triangular folds therein, and means for producing finishing folds and a seated flat bottom subsequently to forming said triangular folds.

In testimony whereof I affix my signature.

DANIEL APPEL.